United States Patent Office 3,194,792
Patented July 13, 1965

3,194,792
UNSATURATED DICARBOXYLIC MONOESTERS, POLYMERS THEREOF, AND METHODS OF PREPARATION
William D. Emmons, Huntingdon Valley, and Dominic R. Falgiatore, Philadelphia, Pa., assignors to Rohm & Haas Company, Philadelphia, Pa., a corporation of Delaware
No Drawing. Filed May 25, 1961, Ser. No. 112,507
13 Claims. (Cl. 260—77.5)

This invention relates to certain unsaturated dicarboxylic acid monoesters of N-(hydroxyalkyl)- or N-(hydroxyoxaalkyl)-1,3-cyclodiazolidin-2-ones, polymers thereof, and methods of preparation. The invention is particularly concerned with new compounds of the above class which are susceptible to both addition polymerization by virtue of their unsaturation and to condensation reactions by virtue of nitrogenous heterocyclic rings therein. Polymers obtained from such compounds and the methods of making the compounds and the polymers are also part of the invention herein.

One of the primary objects of the present invention is to provide novel compounds which are capable of both addition polymerization and condensation reactions. Another object of the invention is to provide novel polymers which contain heterocyclic rings providing therein capacity for condensation by heat alone or by the application of external reagents to form cross-linked products of insoluble and infusible character. Another object of the present invention is to provide novel polymeric compositions adapted for coating or impregnation which have outstanding adhesion toward various substrates and particularly metals, glass, and plastics. Other objects and advantages of the invention will be apparent from the description thereof hereinafter.

The new compounds include monoesters of maleic, fumaric, chloromaleic, itaconic, mesaconic, or citraconic acid with a monohydroxyalcohol which may be generically designated as an N-(hydroxyalkyl)-1,3-cyclodiazolidin-2-one in which the alkyl group has from 2 to 8 carbon atoms and the hydroxyl group is on a carbon atom thereof which is not attached directly to the nitrogen atom of the ring, or in which the alkyl group is replaced by an alkyl group interrupted with ether oxygen atoms. The monohydroxyalcohol may also be designated as an N-(hydroxyalkyl)- or an N-(hydroxy-oxaalkyl)-N,N'-(C₂-C₈)-alkyleneurea. The preferred esters are those of maleic or fumaric acid and they have the general formula:

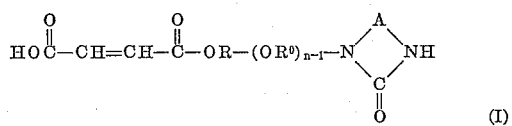

(I)

wherein

R is an alkylene group, having 2 to 8, and preferably 2 to 3, carbon atoms, having at least 2 carbon atoms extending in a chain between adjoining hetero atoms (O or N), R⁰ is an alkylene group having 2 to 3 carbon atoms having at least 2 carbon atoms extending in a chain between adjoining hetero atoms, n is any integer, preferably having a value of 1 to 10, and A is an alkylene group having 2 to 3 carbon atoms, namely, ethylene (—CH₂CH₂—), propylene (—CH₂—CH(CH₃)—)

and trimethylene (—CH₂CH₂CH₂—), having at least 2 carbon atoms extending betwen the adjoining N atoms.

Various ways may be employed for producing the monoesters. Polymers thereof may be obtained as explained hereinafter either by polymerization of the monomers or reaction with polymers of maleic anhydride, itaconic anhydride, or citraconic anhydride.

One preferred way of producing monomers of the present invention is to react maleic anhydride, chloromaleic anhydride, itaconic anhydride, or citraconic anhydride with an alcohol of the Formula II given in the following equation, wherein A, R, R⁰ and n are as defined hereinabove and maleic anhydride (Formula III) is used as representative of the anhydrides:

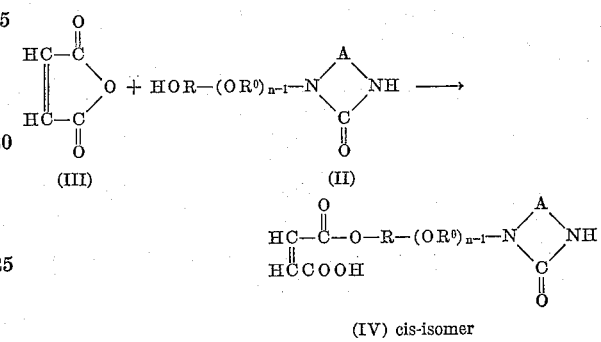

(IV) cis-isomer

This reaction may be effected in an inert solvent such as chloroform, carbon tetrachloride, methylene chloride, toluene, xylenes, dioxane, or tetrahydrofurane. While the ratio of proportions of the anhydride to the alcohol may be varied widely, it is most practical to employ approximately equimolar proportions since those are the proportions in which they react to form the monoester. The reaction may be effected at a temperature of 4° to 200° C. Preferably, the temperature is from 40° C. to 65° C. No catalyst is necessary but if desired, a trace of a strong acid catalyst such as para-toluene sulfonic acid may be added to accelerate the reaction. The reaction is rapid and it is generally advisable to add the alcohol gradually to a solution or suspension of the anhydride in the inert solvent. The time required for reaction will, of course, depend upon the quantities to be reacted and the rate at which the alcohol is added. Generally, a period of 1 to 8 hours is adequate for most practical operations. The product generally precipitates as an insoluble material and in that case is filtered, washed with the same solvent as used during the reaction, and if desired, may be recrystallized from solution in hot water or alcohols such as methyl, ethyl, or isopropyl alcohol. Instead of filtering and washing, the solvent may be evaporated off, particularly if the product is not completely insoluble therein.

The alcohols of Formula II are known compounds (see U.S. Patent 2,727,019) which can be made by various means. For example, urea is fused by heating with an N-hydroxyalkyl-alkylene-diamine, e.g., N-β-hydroxyethyl-ethylenediamine. These products can then be reacted with ethylene oxide, propylene oxide, or trimethylene oxide to form the oxyalkylene versions.

The fumaric monoesters may be prepared from the monomaleates by isomerization, using heat (e.g., 150°–200° C.), ultraviolet light, a small amount of iodine, or a combination of two or all three of these agencies. Similarly, the mesaconic monoesters may be prepared from the monocitraconates by isomerization.

The monomeric monoesters obtained are generally solids having high melting points. They are generally not readily polymerizable by themselves to produce homopolymers except in the case of those derived from itaconic anhydride which do homopolymerize. Surprisingly, however, all of the monomers are copolymerizable with a wide variety of vinyl and acrylic monomers having one or more $CH_2=C<$ groups by any free-radical initiator system. Using conventional free-radical initiators including peroxides, persulfates, and azo compounds, polymerization may be effected by bulk, solution, emulsion, or suspension techniques. The molecular weights depend upon the comonomer to a great extent. Polymers having molecular weights of 50,000 to 200,000 are readily obtainable by solution procedures, whereas higher molecular weights up to several million are obtainable by bulk, emulsion, and suspension polymerization.

Solution polymerization may be effected in such solvents as water, dimethylformamide or other of the solvents mentioned above in which the monomeric compounds, e.g. of Formula I, and any comonomers that may be used are suitably soluble. Although the compounds of Formula I generally have an appreciable solubility in water, these compounds as well as the other comonomers of the present invention whether more or less soluble in water may be copolymerized with water-insoluble monomers by an emulsion technique in which the comonomers and any excess of the compound of Formula I over the amount that is soluble in the water are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.1% to 0.5% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$ - dimethylvaleronitrile), azobis($\alpha$ - methylbutyronitrile), azobis($\alpha$ - methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride (octylbenzyl)trimethylammonium chloride, and so on.

Examples of monoethylenically unsaturated compounds that may be copolymerized with the compounds of the invention include acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, especially the vinyltoluenes, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N - methylacrylamide, N - butylmethacrylamide, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, $\alpha$-methylstyrene, p-methylstyrene, p-chlorostyrene, vinylnaphthalene, etc. When two or more free radical polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

The monomeric monoesters of itaconic anhydride form a special class of compounds of this invention in that each may be homopolymerized to give polymers varying in molecular weight from 10,000 to more than 500,000 if desired. The homopolymers derived therefrom include water-soluble as well as water-insoluble products depending on the hydrophilicity or hydrophobicity imparted by substituents R, R⁰, and A, the long-chain alkylene groups R producing the less soluble monomers. The water-soluble homopolymers are useful as warp sizes, wet-strength resins in paper, thickeners, and flocculants. However, copolymers containing from about 0.5% to 20% by weight or more of the monoesters of itaconic anhydride with various comonomers are adapted to provide valuable coating materials which may be pigmented or not, and may contain plasticizers or not, and in the case of emulsion copolymers, they are adapted to provide valuable water-base paints. Examples of plasticizers that may be used are dibutyl phthalate, butyl benzyl phthalate, triphenyl phosphate, di-n-hexyl adipate, methyl abietate, ethyl phthalyl, ethyl glycolate, tributyl phosphate, diisooctyl phthalate, and glycerol monoricinoleate. Examples of pigments include carbon black, titanium dioxide, ultramarine blue, lead chromate, copper phthalocyanine blues and greens, zinc chromate, zinc oxide, clays, calcium carbonate, lead carbonate, and barium sulfate, iron oxides, toluidines, Prussian blue, chrome yellow, para red toners, lithol red, cadmium red, and chromium oxide.

Copolymers containing units of the monomeric monoesters of the present invention may be obtained by first preparing a copolymer of one of the aforementioned anhydrides, such as maleic anhydride, itaconic anhydride, or citraconic anhydride, and reacting such copolymers with an alcohol of Formula II hereinabove. This reaction may be represented as follows using the copolymeric units of maleic anhydride (Formula V) as representative of the anhydrides:

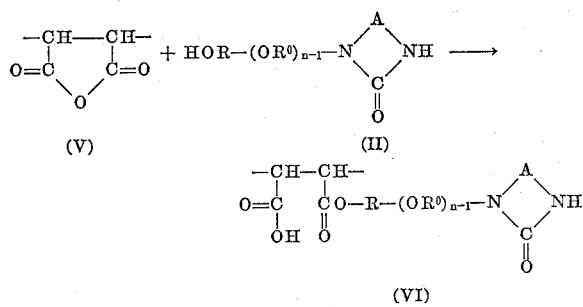

The proportion of alcohol employed depends upon the amount of anhydride units in the copolymer which it is desired to convert into derivative units of the present invention. The proportion, in the copolymers, of the dicarboxylic acid monoester units of the present invention may vary from 0.1% by weight to 50% by weight of the copolymer, but for most practical purposes the range is from 0.1% to 20% by weight of such. Preferred copolymers contain 0.1 to 5% by weight of the dicarboxylic acid monoester units. For many purposes optimum results are even obtained from copolymers containing only about 0.3 to 1% by weight of the units of the present invention in the copolymer.

As the anhydride unit containing polymers which may be used as starting materials in this reaction with an alcohol of Formula II, there may be employed homopolymers of itaconic anhydride and copolymers of the other anhydrides including maleic anhydride, itaconic anhydride, or citraconic anhydride with other monomers containing at least one monoethylenically unsaturated grouping of the formula $CH_2=C<$. Examples of comonomers which may be present in the copolymers of the anhydrides include styrene, ethylene, propylene, isobutylene, butadiene, vinyl esters of fatty acids having from 2 to 18 carbon atoms such as vinyl acetate itself, vinyl chloride, vinylidene chloride, chlorotrifluoroethylene, tetrafluoroethylene, acrylonitrile, methacrylonitrile, esters of acrylic acid, methacrylic acid, or itaconic acid such as the esters with cyclohexanol, benzyl alcohol, phenol, and fatty alcohols having from 1 to 18 carbon atoms including methanol, ethanol, propanol, isopropanol, n-butanol, octanol, dodecanol, and octadecanol, acrylamide, methacrylamide, and N-substituted acrylamides such as N,N-dimethylacrylamide, N,N-dibutyl-methacrylamide, N-ethyl-methacrylamide, vinyl toluenes, and α-methylstyrene. The proportions of the comonomers may be from about 1 to 99%. The entire proportion of anhydride units may be converted to the monoester or only a portion thereof may be so converted leaving anhydride units in the final copolymer containing the acid-monoester units.

The reaction of the anhydride unit containing polymer may be effected by dissolving the polymer in an inert solvent, such as toluene, xylenes, turpentine, dimethyl formamide, acetamide, and then adding the alcohol of Formula II while maintaining the temperature of the reaction medium at about 40° to 200° C. In general, lower temperatures of reaction are preferred to reduce discoloration as well as to avoid side reactions when the copolymer contains ester units or an ester solvent is employed as the reaction medium.

The copolymers containing from 0.1% to 20% by weight of the dicarboxylic acid monoester units of the present invention may be of rubbery to rigid solid character and frequently are quite similar in physical properties to the polymers from which they are obtained by the esterification reaction described hereinabove. Solutions of such copolymers have essentially the same or higher viscosity for a given concentration in a given solvent as those of the initial copolymer from which they are obtained. Likewise, the solubility depends primarily on the comonomer and is generally quite similar to the solubility of the initial polymers from which they are derived.

Copolymers of the present invention are adapted to be converted to insoluble and infusible state through cross-linking reactions effected either by heating the copolymer alone or by reaction with other reactants such as aldehydes and particularly formaldehyde or compounds revertible thereto. Thus, coatings may be formed from solutions of the copolymers or from aqueous dispersions of emulsion copolymers of the present invention and the films converted to insoluble and infusible condition by heating such as to temperatures of 110° C. to 300° C. or by treatment with aldehydes, polyepoxides, polyisocyanates, or anhydrides of polycarboxylic acids. By virtue of the reactivity of the heterocyclic ring in the units of the copolymers of the present invention, extremely useful products of thermosetting character may be obtained using the copolymers alone or in admixture with other resin materials. Thus, the copolymers may be mixed with various aminoplasts or phenolics, including condensates of phenol and formaldehyde, urea and formaldehyde, N,N'-ethylene-urea and formaldehyde, melamine and formaldehyde, and their alkylation products with lower alcohols having from 1 to 4 carbon atoms. They may also be included in thermosetting casting materials such as with methyl methacrylate and with polyester compositions derived from unsaturated dicarboxylic acids, such as maleic esters of ethylene glycol with or without other unsaturated monomers such as styrene, methyl methacrylate, and so on. Such materials are particularly useful in the production of glass fiber-reinforced polyester plastics.

The copolymers of the present invention may be employed as coating compositions, impregnating compositions, as molding compositions, or as part of a thermosetting casting composition for forming molded objects as mentioned above. The polymer solutions prepared by solution polymerization may be directly used with or without dilution with additional solvent for coating or impregnating purposes. Polymers obtained by bulk polymerization or by isolation from the polymerization medium in solution, emulsion, or suspension polymerization may be used directly for extrusion to form films which may be self-supporting or may be applied immediately on extrusion to a substrate to be coated or laminated therewith. Alternatively, such polymers may be dissolved in a solvent or dispersed with the aid of a dispersing agent in a medium within which the polymer is insoluble for application for coating and impregnating purposes.

The copolymers may be applied to various materials for coating and impregnating them, such as paper, leather, wood, glass, metals, either bare or primed, including iron, steel, Monel metal, copper, aluminum, brass, and lead. The copolymers may be applied as coatings on various plastics including poly(methyl methacrylate) copolymers of vinyl acetate and vinyl chloride, polyethylene, polyesters obtained by the condensation of an aliphatic or aromatic dicarboxylic acid (such as phthalic or adipic) with a glycol or other polyol such as ethylene glycol, diethylene glycol, trimethylol ethane, and glycerine. The copolymers are also useful for the pigment-dyeing and printing of textiles, fabric backing coatings such as rug backings, as bonding agents for fibers in non-woven fabrics, and for wool stabilization. Thus, copolymers containing from 5 to 20% by weight of a monomeric compound of the present invention with ethyl acrylate, butyl acrylate, or the like, are useful to reduce the shrinkage of wool. For this purpose, they may be applied in aqueous dispersions of a concentration from 10 to 30% so that from about 5 to 15% by weight of the copolymer is deposited on the wool fabric. After drying, the treated fabric may be heated to 240° F. to 350° F. for a period of one-half to fifteen minutes. The copolymers containing ½ to 5% or even up to 10 or 20% by weight of units derived from a monomer of the present invention are also excellent binders for non-woven fabrics of all types of natural and synthetic fibers or filaments made by the air-deposition, carding, or garnetting of the fibers or filaments, such as those of rayon, wool, cellulose acetate and other esters and ethers, vinyl resins, polymers of acrylonitrile, poly(ethylene glycol terephthalate), glass, and other mineral fibers, and so on. For this purpose, there may be used from 5 to 150% by weight of the binder on the weight of fiber or even as high as 400% thereon. The treated fibrous material should be dried and then subjected to a bake, such as at 240° F. to 350° F. for a period of one-half to thirty minutes, to cure the polymer thereon. Similar aqueous dispersions made by the emulsion copolymerization of a monomer of the present invention with acrylic esters and especially butyl acrylate or ethyl acrylate are useful, with or without pigment, for the primary coating of leather. In this connection, the heterocyclic group apparently exerts some chemical bonding action with the structure of the leather so as to provide good adhesion. Copolymers with acrylonitrile, especially those containing 75 to 90% of acrylonitrile, with a monomeric compound of the present invention provide useful fiber- and film-forming materials which are adapted to be spun or cast to form fibers and films which are characterized by improved receptivity toward dyes. Copolymers of a monomeric compound of the present invention with acrylic acid or methacrylic acid when included in melts or solutions of polymers of acrylonitrile containing 75 to 90% acrylonitrile, such as copolymers thereof with vinyl chloride, vinyl acetate or the like, serve to modify the dyeing properties of fibers and films formed therefrom.

In all of the applications as coatings and impregnants, the copolymer after drying may be heated to temperatures of 110° C. to 300° C. for a period of time such as one-half hour to one hour at the lower temperature down to about 30 seconds to five minutes at the upper temperature. Such heating converts the copolymer to insoluble and infusible condition rendering the coating or impregnant resistant to solvents and resistant to melting on heating.

The various copolymer containing units of the present invention are outstanding in respect to their capacity to impart adhesion toward various substrates including metals whether bare or primed, glass, plastics, wood, paper, leather, and textiles. Such copolymers are also characterized by outstanding dispersing properties favoring the inclusion of fillers and pigments, in amounts of 0.2 to 15% by weight of the copolymer, in the coating and molding compositions made with the copolymers whether as aqueous dispersions or in organic media. The acid groups in such copolymers are also reactive with epoxy compounds, isocyanates, and acid anhydrides so that coatings, impregnants, and other formed masses made of such copolymers are adapted to be converted to insoluble and infusible condition by reaction with polyepoxides such as alkylene or arylene polyepoxides, including alpha, omega-diepoxyhexane and isopropylidene-bis-phenyl glycidyl ether, with polyisocyanates such as alpha, omega-diisocyanatohexane, diisocyanatophenylmethane, and tolylene diisocyanate, and acid anhydrides such as pyromellitic anhydride. The acid-containing polymers may be converted into the ester derivatives by mixing with diazomethane in the cold.

The acid-containing monoester copolymers of the present invention, because of their outstanding adhesion, are adapted to produce excellent automotive lacquers either for use as primers or topcoats or both, which may be allowed to remain in thermoplastic condition or converted to infusible condition as desired. They are also useful for the production of thermosetting enamels such as enamels for refrigerators, stoves, and other household appliances. For these purposes, they are useful alone or may be mixed with polyepoxy resins or aminoplast resins such as butylated methylol melamines and polyepoxides obtained from bis-phenols such as Bis-phenol A by reaction with epichlorohydrin.

A preferred class of compounds of this invention are the monoesters derived from maleic or itaconic anhydride, particularly maleic, itaconic, chloromaleic, and citraconic. These compounds are readily prepared in high yield and purity from commercially-available intermediates. The compounds are unique in their combination of functionality including carboxyl, cyclic urea, and unsaturation. All of these groups are available for controlled condensation or addition reactions. Although these materials are easily converted to polymers under the particular conditions disclosed in this invention, they are stable over long periods of time even when stored at room temperature. The functionality of these materials after addition polymerization imparts unexpected adhesive properties to the resultant polymers. These polymers are also readily modified by subsequent reaction of these functional groups to give graft, block or insoluble polymers as noted in the description of the invention.

The following examples are illustrative of the invention and the parts and percentages therein are by weight unless otherwise specifically designated.

*Example 1*

A mixture of 260.0 g. (2.0) moles of N-($\beta$-hydroxyethyl)-N,N'-ethyleneurea, 196.0 g. (2.0) moles of maleic anhydride and 300.0 g. of freshly distilled acetonitrile is refluxed with stirring for six hours. A portion of acetonitrile is removed under reduced pressure. The residue is cooled to 0–5° C. and the precipitated product is purified by recrystallization from methanol to give an approximately 32.1% yield of $\beta$-(ethyleneureido) ethyl acid maleate, M.P. 120–123° C. The product contains 12.5% nitrogen with an acid No. 247 in agreement with the calculated values of 12.28% nitrogen and 245.9 acid number.

*Example 2*

The procedure of Example 1 is repeated substituting chloroform for acetonitrile. The precipitated product is purified by recrystallization from methanol to give an approximately 49.2% yield of $\beta$-(ethyleneureido) ethyl acid maleate, M.P. 125–127° C. The product contains 12.3% nitrogen with an acid No. 246 in agreement with the calculated values of 12.28% nitrogen and 245.9 acid number.

*Example 3*

The procedure of Example 1 is repeated substituting methylene dichloride for acetonitrile. The crude precipitated product is filtered to give an approximately 47.7% yield of $\beta$(ethyleneureido)ethyl acid maleate, M.P. 126–129° C. The product contains 12.3% nitrogen with an acid No. 246 in agreement with the calculated value in Example 1.

*Example 4*

A stirred melt of 228.0 g. (1.0 mole) of $\beta$-(N,N'-ethyleneureido) ethyl acid maleate containing a crystal of iodine is maintained at 150° for one hour. After cooling, the solid material is washed with methylene chloride and recrystallized from methanol to yield $\beta$-(N,N'-ethyleneureido) ethyl acid fumarate. The product contains 12.5% nitrogen with an acid No. 246 in agreement with the calculated values of 12.28% nitrogen and 245.9 acid number.

*Example 5*

A solution of 130.0 g. (1.0 mole) of N-($\beta$-hydroxyethyl) N,N'-ethyleneurea and 112.0 g. (1.0 mole) of itaconic anhydride in 200 ml. of dry acetonitrile is refluxed with stirring for five hours. The bulk of the acetonitrile is removed at reduced pressure and the residue recrystallized from methanol to yield $\beta$-(N,N'-ethyleneureido) ethyl acid itaconate. The product contains 11.8% nitrogen with an acid No. 234 in agreement with the calculated values of 11.56% nitrogen and 232.0 acid number.

Example 6

Example 1 is repeated replacing the first reactant therein with 316 g. of N-(β-hydroxypropyl)-N,N'-propyleneurea of the formula

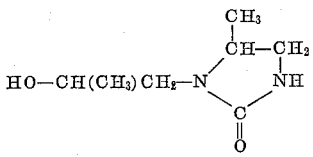

and using 224 g. of itaconic anhydride. The product is β-(N,N'-propyleneureido)propyl acid itaconate as determined by nitrogen analysis and the acid number.

Example 7

Example 5 is repeated replacing the first reactant with 174 grams of N-(hydroxyethoxyethyl)-N,N'-ethyleneurea yielding a product β-(N,N'-ethyleneureido)-ethoxyethyl acid itaconate.

Example 8

An initial charge consisting of 12.0 grams β-(N,N'-ethyleneureido) ethyl acid maleate, 37.55 grams of methyl methacrylate, 210.0 grams of styrene, 0.25 grams of methacrylic acid, 0.16 gram of benzoyl peroxide, 140.0 grams of n-butanol and 35.2 grams of toluene is charged to a glass reaction vessel provided with a nitrogen atmosphere. The mixture in the flask is stirred, heated to 100–102° C., and held at this temperature for one hour. Immediately thereafter, a second charge consisting of 337.93 grams of methyl methacrylate, 2.27 grams of methacrylic acid, 1.46 grams of benzoyl peroxide and 316.8 grams of toluene is added in the course of one hour to the partially polymerized reaction media while maintaining the reaction temperature at 100–102° C. The temperature is held at 100–102° C. for five hours and then raised to 107–109° C. Three, four and one-half, six and one-half and eight and one-half hours after the polymerization has started the reaction is recatalyzed respectively with 0.6 gram, 0.6 gram, 0.3 gram and 0.3 gram portions of benzoyl peroxide. After a total of twelve hours the resin is diluted with 352.0 grams of toluene. The final copolymer composition is essentially a blend of copolymer having an overall composition of 62.58% by weight of methyl methacrylate, 35.0% styrene, 2.0% of the urea derivative and 0.42% of methacrylic acid in a solvent system containing toluene and n-butanol in the ratio of 85:15. The Gardner-Holdt viscosity is (Y−) at approximately 40% solids.

Example 9

A charge comprising 166.0 grams of methyl methacrylate, 146.5 grams of ethyl acrylate, 1.25 grams of benzoyl peroxide and 208.0 grams of toluene is added in the course of one hour to a glass reaction vessel containing 12.5 grams of β-(ethyleneureido) ethyl acid maleate, 175.0 grams of styrene and 125.0 grams of n-butanol maintained at 104–105° C. by means of external heating. The mixture in the flask is stirred during the addition and subsequent reaction under a nitrogen atmosphere. The temperature is held at 104–105° C. for two hours and then raised to 107–108° C. for the remaining ten hours of polymerization. Two, four and six hours after the polymerization has started the reaction is recatalyzed with 0.5 gram portions of benzoyl peroxide. At the end of six hours, the reaction mixture is diluted with 167.0 grams of toluene over a forty-five minute period. Continued heating for a total of twelve hours completes the polymerization cycle. The final composition is essentially a blend containing 33.2% by weight of methyl methacrylate, 35.0% styrene, 29.3% ethyl acrylate and 2.5% of the urea derivative in a solvent system containing toluene and n-butanol in the ratio of 75:25. The Gardner-Holdt viscosity is (Z−1) at approximately 50% solids.

Example 10

An initial charge consisting of 12.0 grams β-ethyleneureido) ethyl acid maleate, 93.0 grams of methyl methacrylate, 120.0 grams of styrene, 0.5 gram methacrylic acid, 0.3 gram benzoyl peroxide, 140.0 grams of n-butanol and 70.4 grams of toluene is charged to a glass reaction vessel provided with a nitrogen atmosphere. The mixture in the flask is stirred, heated to 100–102° C., and held at this temperature for one hour. Immediately thereafter a second charge consisting of 372.4 grams of methyl methacrylate, 2.0 grams of methacrylic acid, 1.2 grams of benzoyl peroxide and 281.6 grams of toluene is added in the course of one hour to the partially polymerized reaction media while maintaining the reaction temperature at 100–102° C. At the end of two and three-quarter hours, the mixture is diluted with 408.0 grams of toluene over a forty-five minute period. Stirring and heating are maintained at 100–102° C. Three and four and one-half hours after the polymerization has started the reaction is recatalyzed with 0.6 gram portions of benzoyl peroxide. The temperature is held at 100–102° C. for five hours and then raised to 107–109° C. After a total of twelve hours the resin is diluted with 500.0 grams of toluene. The final copolymer composition is essentially a blend containing 77.58% by weight of methyl methacrylate, 20.0% of styrene, 2.0% of the urea derivative and 0.42% of methacrylic acid in a solvent system containing toluene and n-butanol in the ratio of 90:10. The Gardner-Holdt viscosity is (G) at approximately 30% solids.

Example 11

A charge comprising 241.0 grams of methyl methacrylate, 100.0 grams of styrene, 146.0 grams of ethyl acrylate, 1.25 grams of benzoyl peroxide and 243.0 grams of toluene is added in the course of two hours to a glass reaction vessel containing 12.5 grams of β-(ethyleneureido) ethyl acid maleate, 125.0 grams of n-butanol and 243.0 grams of toluene maintained at 104–105° C. by means of external heating. The mixture in the flask is stirred during the addition and subsequent reaction under a nitrogen atmosphere. The temperature is held at 104–105° C. for two hours and then raised to 107–108° C. for the remaining eight hours of polymerization. Two, four and six hours after the polymerization has started the reaction is recatalyzed with 0.5 gram portions of benzoyl peroxide. After a total of eight hours the resin is diluted with 139.0 grams of toluene. The final copolymer composition is essentially a blend containing 48.2% by weight of methyl methacrylate, 20.0% of styrene, 29.3% of ethyl acrylate and 2.5% of the urea derivative in a solvent system containing toluene and n-butanol in the ratio of 83:17. The Gardner-Holdt viscosity is (K) at approximately 40% solids.

Example 12

The procedure of Example 8 hereof is repeated substituting in the initial monomer charge 12.0 g. of β-(ethyleneureido) ethyl acid fumarate for the urea derivative.

Example 13

The procedure of Example 8 hereof is repeated substituting in the initial monomer charge 12.0 g. of β-(ethyleneureido) ethyl acid itaconate for the urea derivative.

Example 14

A charge comprising 241.0 grams of methyl methacrylate, 100.0 grams of styrene, 146.0 grams of ethyl acrylate, 5.37 grams of maleic anhydride and 1.25 grams of benzoyl peroxide is added in the course of two hours to a glass reaction vessel containing 486.0 grams of toluene maintained at reflux by means of external heating. The mixture in the flask is stirred during the addition and subsequent reaction under a nitrogen atmosphere. Reflux is continued, and at the end of the second, fourth and sixth hours the polymerization is recatalyzed with 0.5 gram portions of benzoyl peroxide. A total of eight hours completes the polymerization cycle. To the reaction is then added 7.13 grams of N-(β-hydroxyethyl) ethyleneurea and reflux is continued for an additional twenty-four hours. A dilution with 125.0 grams of n-butanol and 139.0 grams of toluene completes the reaction process. The final copolymer composition contains 48.2% by weight of methyl methacrylate, 20.0% styrene, 29.3% of ethyl acrylate and 2.5% of the urea derivative in a solvent system containing toluene and n-butanol in the ratio of 83:17. The Gardner-Holdt viscosity is (K) at approximately 40% solids.

The test methods used in the following examples to determine hardness, resistance to gasoline, gloss, water-spotting, tape adhesion, flexibility and resistance to staining by tar are familiar in the automotive lacquer coating field. A brief description of the tests is as follows:

The hardness is calculated from the size of a diamond imprint on the surface using a Tukon hardness tester. The higher the Knoop value, the harder the coating. Automotive lacquer coatings are commonly in the 8 to 10 Knoop region.

Gasoline softening is determined with a test fluid composed of 80% diisobutylene and 20% toluene (weight %). A cloth pad saturated with the fluid is placed in contact with the coated surface and covered with a watch glass. After a 1-hour exposure, the cloth pad and watch glass are removed, and the coating surface is stroked with a fingernail to see if any serious softening has occurred. Any blisters or solvent wash rings are observed. Gloss is determined by a 60° Photovolt Glossmeter which measures percent reflectance.

Water spotting is observed on test panels which have been exposed 1000 hours in a 100° F.—100% relative humidity chamber. This observation is made after the panel has returned to normal room conditions. Any blistering, cracking, or crazing is observed.

The tape adhesion test is performed by scribing an X at an edge of the test panel with a razor blade, adhering a length of 1″ wide Scotch cellophane tape over this area, and removing the tape with a jerk by pulling an overhanging length of tape at about a 15° angle to the surface. Any removal of coating is noted.

Flexibility is considered satisfactory if the coated panel can be bent through 180° around a ⅜-inch diameter mandrel with the coated face outside without damaging the coating or loosening it from the panel.

Tar staining is observed after a 24-hour contact of the lacquer surface with a pool of No. 2 Cut Back. If the tar can be wiped off with no discoloration of the lacquer surface, the coating is considered stain-resistant.

*Example 15*

(a) There is ground by three passes on a 3-roll mill a paste consisting of 45 parts of titanium dioxide, 10 parts of the acetate of the monoethyl ether of ethylene glycol hereinafter referred to simply as AMEG, and 45 parts of a 30% solution in a solvent consisting of a mixture of toluene, methyl ethyl ketone, and n-butanol in a ratio of 45:45:10 of a copolymer, having a viscosity average molecular weight of about 80,000–90,000 obtained as in Example 8.

(b) A lacquer mixture is prepared by mixing 100 parts of the ground pigment paste with 235 parts of the same 30% copolymer solution, 21 parts of butyl benzyl phthalate and 394 parts of a solvent mixture comprising toluene, acetone and AMEG in a volume ratio of 42.5:42.5:15 (at room temperature). The resulting composition has a 30:70 pigment:binder ratio, a 80:20 copolymer:plasticizer ratio, and a 20% solids content when reduced to a spray consisting of 11.5 seconds No. 4 Ford cup viscosity.

(c) The lacquer is sprayed to form a dry film thickness of 2.5 mils on Bonderized steel panels provided with a baked iron oxide poly(vic-epoxide) resin automotive primer. The coating is air-dried 15 minutes and then force-dried in an oven at 180° F. for 30 minutes.

(d) The coating obtained has a Knoop Hardness Number (KHN) of about 9. It is resistant to gasoline, shows no water-spotting, and is resistant to staining by tar. It shows good adhesion, none of the coating being removed by the tape-adhesion tests. It has good flexibility. It has good gloss even when determined on the unpolished coating.

*Example 16*

Example 1 is repeated except that the copolymer of Example 9 is used. Similar results were obtained.

*Example 17*

Example 15 is repeated with a copolymer of Example 10. Good gloss is obtained in unpolished coatings along with resistance to tar-staining, gasoline, and water-spotting. The coatings had good adhesion and flexibility.

*Example 18*

Example 15 is repeated with comparably good results in hardness, gloss, adhesion, and resistance to tar-staining, gasoline, and water-spotting when the copolymer therein is replaced with the copolymer of Example 11.

*Example 19*

Example 15 is repeated using the copolymer of Example 12. Similar results are obtained.

*Example 20*

Coatings having good gloss even when unpolished are obtained by the procedure of Example 1 but using the copolymer of Example 13, the coating being however applied as a topcoat over an undercoat of an epoxyhydroxy ether resin esterified by 4.46% of phosphoric said (Example 3 of U.S. Patent 2,887,404.)

*Example 21*

Example 15 is repeated with comparably good results in hardness, gloss, adhesion, and resistance to tar-staining, gasoline, and water-spotting when the copolymer therein is replaced with the copolymer of Example 14.

We claim:

1. As a composition of matter, a dicarboxylic acid monoester of a monohydroxyalcohol of the formula

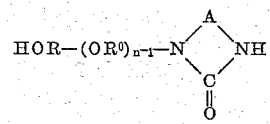

where

R is a ($C_2$–$C_8$)-alkylene group,
R° is a ($C_2$–$C_3$)-alkylene group,
$n$ is an integer having a value of 1 to 10, and
A is a ($C_2$–$C_3$)-alkylene group, the dicarboxylic acid being selected from the group consisting of maleic acid, fumaric acid, and itaconic acid.

2. As a composition of matter, a compound of the formula

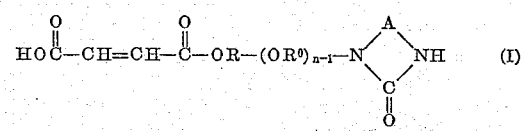

where

R is a ($C_2$–$C_8$)-alkylene group,
R° is a ($C_2$–$C_3$)-alkylene group,
$n$ is an integer having a value of 1 to 10, and A is a $(C_2-C_3)$-alkylene group.

3. As a composition of matter, a compound of the formula

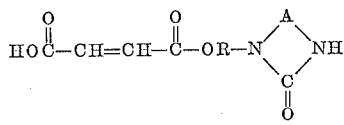

where
R is a $(C_2-C_3)$-alkylene group and
A is a $(C_2-C_3)$-alkylene group.

4. As a composition of matter, a compound of the formula

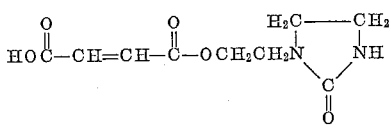

5. As a composition of matter, an itaconic monoester of a monohydroxyalcohol of the formula

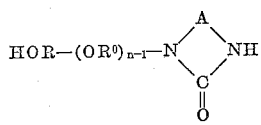

where
R is a $(C_2-C_3)$-alkylene group,
R° is a $(C_2-C_3)$-alkylene group,
$n$ is an integer having a value of 1 to 10, and
A is a $(C_2-C_3)$-alkylene group.

6. A homopolymer of a compound of claim 5.

7. An addition copolymer consisting of from about 0.1 to 20% by weight of the copolymer of at least one monoester of claim 1 with at least one copolymerizable monomer containing at least one ethylenically unsaturated group of the formula $CH_2=C<$.

8. An addition copolymer consisting of from about 0.1 to 5% by weight of the copolymer of at least one monoester of claim 1 with at least one copolymerizable monomer containing at least one ethylenically unsaturated group of the formula $CH_2=C<$.

9. An addition copolymer consisting of from about 0.5 to 20% by weight of the copolymer of at least one monoester of claim 5 with at least one copolymerizable monomer containing at least one ethylenically unsaturated group of the formula $CH_2=C<$.

10. An addition copolymer consisting of from about 0.5 to 20% by weight of the copolymer of at least one compound of claim 2 with at least one copolymerizable monomer containing at least one ethylenically unsaturated group of the formula

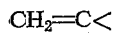

11. An addition copolymer consisting of from about 0.5 to 20% by weight of the copolymer of at least one compound of claim 3 with at least one copolymerizable monomer containing at least one ethylenically unsaturated group of the formula

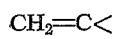

12. An addition copolymer consisting of from about 0.5 to 20% by weight of the copolymer of at least one compound of claim 4 with at least one copolymerizable monomer containing at least one ethylenically unsaturated group of the formula

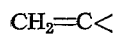

13. The method comprising reacting an anhydride selected from the group consisting of maleic and itaconic anhydrides with an alcohol of the formula

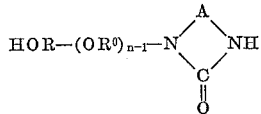

where
R is a $(C_2-C_3)$-alkylene group,
R° is a $(C_2-C_3)$-alkylene group,
$n$ is an integer having a value of 1 to 10, and
A is a $(C_2-C_3)$-alkylene group, the reaction being effected in an inert solvent at a temperature of 40 to 200° C., and recovering a monoester of the alcohol and the respective acid.

References Cited by the Examiner

UNITED STATES PATENTS

| | | | |
|---|---|---|---|
| 2,980,652 | 4/61 | Melamed et al. | 260—309.7 XR |
| 2,987,514 | 6/61 | Hughes et al. | 260—251 |

FOREIGN PATENTS

| | | |
|---|---|---|
| 577,735 | 5/46 | Great Britain. |
| 697,839 | 9/53 | Great Britain. |

LEON J. BERCOVITZ, *Primary Examiner.*

HAROLD N. BURSTEIN, JOSEPH R. LIBERMAN,
*Examiners.*